United States Patent [19]

Polito et al.

[11] Patent Number: 4,943,776
[45] Date of Patent: Jul. 24, 1990

[54] DEVICE AND A METHOD FOR THE DETECTION OF PINKING IN OTTO ENGINES

[75] Inventors: Gino Polito, Voghera; Franco Maloberti, Torre D'Isola, both of Italy

[73] Assignee: Marelli Autronica S.p.A., Milan, Italy

[21] Appl. No.: 372,968

[22] Filed: Jun. 29, 1989

[30] Foreign Application Priority Data

Sep. 15, 1988 [IT] Italy ................................ 67819 A/88

[51] Int. Cl.⁵ ............................................. F02P 17/00
[52] U.S. Cl. .................................... 324/391; 324/378; 73/35
[58] Field of Search ............... 324/378, 379, 380, 384, 324/391, 392, 402, 613, 612; 73/35

[56] References Cited

U.S. PATENT DOCUMENTS

| 4,364,260 | 12/1982 | Chen et al. | 73/35 |
| 4,467,634 | 8/1984 | Ronde et al. | 73/35 |
| 4,608,855 | 9/1986 | Blauhut | 73/35 |
| 4,637,245 | 1/1987 | Iwata et al. | 73/35 |
| 4,640,250 | 2/1987 | Hosara et al. | 73/35 X |

FOREIGN PATENT DOCUMENTS 2431799 7/1974 Fed. Rep. of Germany ...... 324/402

Primary Examiner—Reinhard J. Eisenzopf
Assistant Examiner—Robert W. Mueller
Attorney, Agent, or Firm—Sughrue, Mion, Zinn, Macpeak & Seas

[57] ABSTRACT

The signal provided by an accelerometric sensor (S) connected to the engine is monitored in two frequency bands (f1, f2) in which peaks indicative of the presence of pinking (knocking) may appear. The intensity of the signal detected in the second band (f2) is compared (3) with the intensity of the signal detected in the first band (f1). The comparison (20) of the detection-signal component (F1 and/or F2) with the noise component (F3), in view of the emission of the pinking signal (21), is carried out in different ways (8, 13, 14) according to the relative ratios between the above intensities.

22 Claims, 1 Drawing Sheet

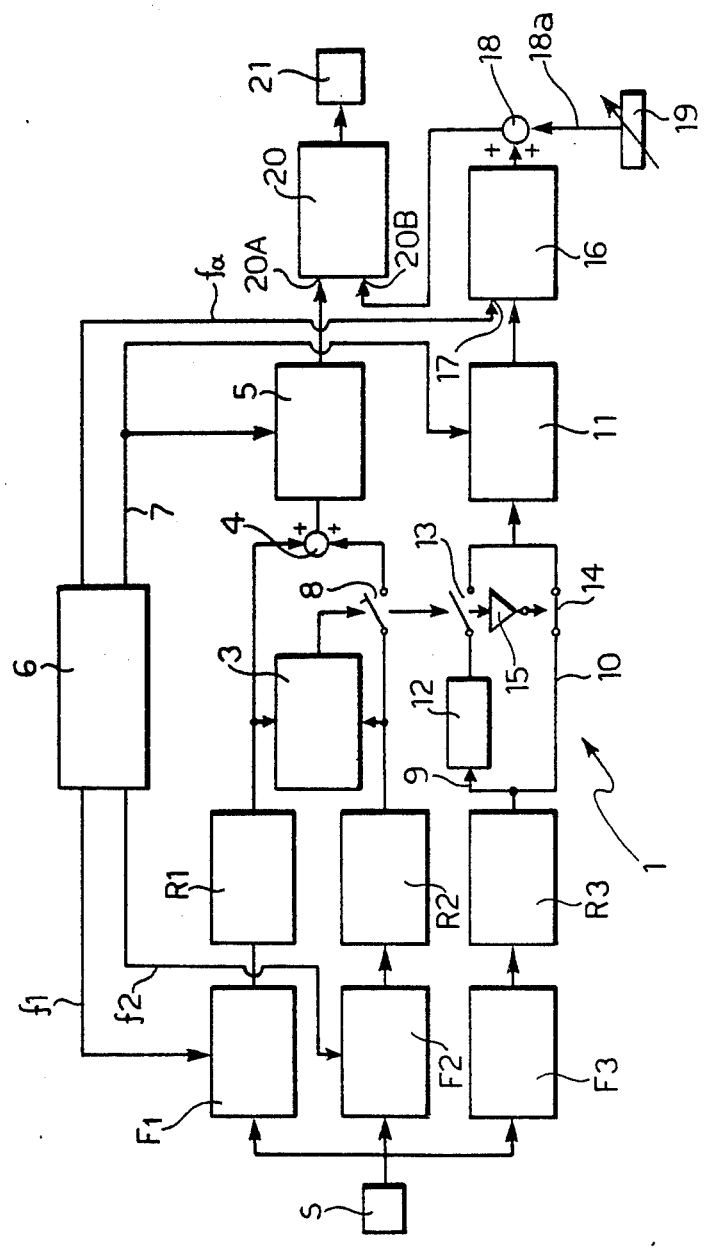

DEVICE AND A METHOD FOR THE DETECTION OF PINKING IN OTTO ENGINES

BACKGROUND OF THE INVENTION

The present invention relates in general to the problem of detecting pinking (knocking) in internal combustion engines, particularly as far as controlled-ignition (Otto) engines for vehicular use are concerned.

Pinking occurs in such engines for various reasons (supercharging, high compression ratio, certain loading conditions, etc.) due to self-ignition of the explosive mixture when the piston is near top dead centre (TDC). The pinking is noticeable from the outside as a characteristic metallic sound known as "pinging".

In the event of pinking, there is no great difference in the form of the pressure cycle (between the compression, combustion and power stages of the engine) but oscillations arise which are superimposed on the normal cycle in correspondence with its maximum.

The frequency of these oscillations is determined by the dimensions of the combustion chamber when pinking occurs. The resonant frequencies $f_{nm}$ can be calculated theoretically by considering a system with a cylindrical cavity with a diameter equal to the bore:

$$f_{nm} = \frac{\beta_{nm}}{\pi} \frac{C}{D}$$

where $\beta_{nm}$ are the values of a Bessel function; C is the speed of sound: $C = 20 T^{\frac{1}{2}}$ (T = the temperature of the fluid); D is the diameter of the cylinder (the bore). For example, for a bore with a value of approximately 80 mm, it is possible to calculate that the principal modes of vibration correspond to frequencies of 8, 13.8, 15.8 and 18.2 KHz.

The calculations is valid for the situation which occurs up to 5°-10° after TDC; subsequently, the resonant frequencies shift to lower frequencies as a result of the decrease in the temperature of the fluid in the cylinder (delta $f \simeq 2KHz$). This shift also takes place in relation to the rate of rotation (r.p.m.) of the engine, since the temperature of the fluid increases as the rate of rotation increases.

The pressure oscillations which are generated in the presence of pinking are transmitted through the walls of the cylinder and can be detected by a sensor. However, this sensor also detects the vibrations due to normal combustion and those due to the moving mechanical parts. The output signal of the sensor must therefore be processed to separate the signal due to the pinking from the background noise which varies in dependence on the rate of rotation (r.p.m.) of the engine and the extent of wear.

More specifically, pinking can be detected by means of a pressure sensor facing into the combustion chamber, or by means of a piezoelectric accelerometer mounted on the engine block. The latter is usually preferred for reasons of cost and reliability, even though the pressure sensor identifies pinking directly.

The piezoelectric accelerometer is characterized by a frequency response with a lower zone of use in which the output is proportional only to the amplitude of the variations, and a higher zone in which the response also depends on the frequency of the vibrations.

The accelerometric sensor is mounted on the engine block, typically on the head or near the intake manifold: since the intensity of the vibrations depends on its position on the engine, it would seem that the sensor should be located in a certain position. In fact, there is no appreciable improvement in the signal/noise (S/N) ratio because the intensity of the background noise (vibrations not due to pinking) is also greater.

A spectral analysis of the signal in the absence of pinking shows that the noise level decreases beyond a frequency of approximately 6KHz. This suggests that a better signal/noise ratio may be obtained in correspondence with the resonant frequencies of the higher modes; in fact, in the presence of pinking, the levels of the signals at 8 and 13.8 KHz show no significant differences, unlike the noise which decreases.

In the presence of pinking, the spectrum of the signal gives three types of trace: the presence of peaks at both 8 and 13.8 KHz; the presence of only one peak at 8 KHz and the presence of only one peak at 13.8 KHz. This probably depends on the intensity of the phenomenon: the higher the compression ratio, the more of a peak there is at 13.8 KHz.

DESCRIPTION OF THE PRIOR ART

A key point for correct detection is the determination of the noise reference level. For this purpose, in order to eliminate false detections due to peaks which occur during normal combustion, it has been proposed to average several cycles so as to provide an average noise level, and the threshold for discriminating between combustion and pinking is given by K times this average level, where the value of K varies with the rate of rotation of the engine.

In the case of a sensor for each cylinder, however, the value of K is constant since there is no overlap between the band defining the background noise and that defining the noise due to the pinking. However, when a single sensor is used, the two bands are very close together or even superimposed and discrimination is achieved according to the strategy described initially.

In particular, it has been suggested that a noise "listening" window of approximately 70° is opened at the TDC of combustion. Pinking is detected by a comparison of the noise integrated during the listening window of an engine stage (180°) with a weighted average of that relating to four preceding stages. The K value used for the comparison is a function of the rate of rotation of the engine, whose values are stored in a data table of the system.

Alternatively, the comparator determines the presence of pinking on the basis of an average signal obtained through a low-pass filter sensitive only to variations in the background noise which are slow compared to those caused by pinking.

As another alternative, it is possible to "listen" for noise only during a fixed angular window after the TDC (as in the first solution described) so as to eliminate the noises which are not due to pinking. The input signals of the comparator come from two integrators with different time constants; the one with a low constant integrates the noise at each angular window and is then reset; the one with a high time constant is sensitive only to slow variations of the background noise and provides the (variable) threshold value of the comparator.

In the presence of pinking, the output of the first integrator increases and exceeds that of the second, which is not affected, and the comparator switches over.

A basic problem common to all the known solutions described is the design of the band-pass filter associated with the sensor. It is important to determine the correct band width, since the ability to extract the frequencies most affected by pinking depends on it: if it is too wide, the possibility of the detection of false pinking increases; if it is too narrow, it is possible to lose the band which is of interest as a result of the shift in frequency due to its variation with the rate of rotation of the engine.

OBJECTS AND SUMMARY OF THE INVENTION

The object of the present invention is to provide a device for detecting pinking in an internal combustion engine, which can be associated with an accelerometric sensor according to the criteria described above and which can extract the signal due to pinking from the output signal of the sensor.

In summary, the device according to the invention is based on the observation of the fact that, as has been seen above, the pinking signal is characterised by several peaks in the frequency spectrum, which correspond to the resonant frequencies of pressure waves in a cylindrical cavity. The frequencies of the peaks are related according to the theoretical ratios $f2/f1=1.7$ and $f3/f1=2.4$. The frequencies of the peaks vary with the square root of the absolute temperature of the fluid in the cylinder (and therefore with the rate of rotation of the engine). The pinking signal is present after TDC and is significant up to approximately 70° thereafter.

The device according to the invention is constituted essentially by two monitoring lines for recognising the first two peaks of the pinking signal and one line for determining the noise level. The tuning frequencies of the filters are linked and are programmable digitally to take into account the frequency shift due to the variation of the temperature in the cylinder. The Q factors of the filters can also be adjusted by a digital control.

BRIEF DESCRIPTION OF THE DRAWING

The single FIG. is a block diagram of pinking detection circuit.

DETAILED DESCRIPTION OF THE INVENTION

The invention will now be described, purely by way of non-limiting example, with reference to the appended drawing which illustrates the structure of a device according to the invention, in the form of a block diagram.

In the drawing, a device, generally indicated 1, is intended to be connected to an accelerometric sensor S in order to detect pinking (knocking) in an internal combustion engine with controlled ignition (Otto cycle), not illustrated in the drawings.

The accelerometric sensor S is constituted by a sensor of any known type. Its mounting arrangement on the engine is also considered to be known: in this connection, reference may be made to the discussion of the theoretical basis of the invention and to the analysis of the prior art carried out in the introduction to the present description.

In FIG. 1, the references F1, F2 and F3 indicate three filters which receive the output signal of the sensor S at their inputs, on a common input line 2. As indicated above, this signal generally contains:

a useful signal component which may contain information relating to the occurrence of pinking, and a noise component induced by the vibrations due to the normal combustion of the engine and the movement of its parts.

Each filter F1, F2, F3 has a respective double-half-wave rectifier R1, R2, R3 connected to its output. The outputs of the two rectifiers R1 and R2 are applied to the inputs of a comparator 3 and also to an adding node 4 situated at the input of the integrator circuit 5. The integrator circuit 5 is enabled to operate periodically in synchronism with the rotation of the engine by a control unit 6 (typically a microprocessor) which generates a corresponding signal on a line 7. The synchronizing signal present on the line 7 enables the integrator 5 for a period of time which corresponds to an observation or detection window, so as to create a "listening" window around the TDC of combustion, according to the general criteria already described in the introduction to the present description.

The microprocessor 6 also controls the tuning frequencies of the (band-pass) filters F1, F2 by means of digital signals sent on respective lines f1 and f2, ensuring the linking of these frequencies so as to take into account the shift in frequency caused by the variation of the rate of rotation of the engine. The Q factor (Q) of the filters may also be selectively controllable by the microprocessor 6.

A switch (typically an electronic switch) is interposed in the line which connects the output of the rectifier R2 to the adding node 4 and makes the connection only if the comparison effected in the comparator 3 indicates that the output signal of the rectifier R2 has reached a certain value (for example ½) relative to the output signal of the rectifier R1.

The output signal of the rectifier R3, however, is sent on two lines 9 and 10 which both lead to a further integrator 11 that is also enabled to operate periodically during the observation or detection ("listening") window determined by the synchronizing signal emitted by the microprocessor 6 on the line 7.

A multiplier element (amplifier) 12 is interposed in the connecting line 9 and multiples the amplitude of signal from the rectifier R3 by a factor of the square root of 2.

Two further electronic switches, indicated 13 and 14, are also piloted by the output of the comparator 3, in a direct manner and a complementary manner respectively, by the presence of an inverter 15 associated with the switch 14.

Consequently, therefore, when the switch 8 is closed to connect the output of the rectifier R2 to the integrator 5, the switch 13 interposed in the line 9 is also closed so that the output of the rectifier R3, increased by the factor of the square root of 2 by the multiplier 12, is applied to the input of the integrator 11, whilst the switch 14 remains open. When the switch 8 is opened, however, the switch 13 also opens and the switch 14 interposed in the line 10 is closed: under these conditions, the output of the rectifier R3 is connected to the input of the integrator 11 without multiplication.

A further filter, indicated 16, is intended to filter the noise samples at the end of the integration window during which the integrator 11 is activated. An offset voltage provided on a line 18a connected to an adjustment control 19 of the device is added at an adding node 18 to the output of the filter 16, which receives an operating phase signal f alpha provided by the control unit 6 at an input 17. The output voltage of the integrator 5 and the output voltage of the integrator 11 (the latter filtered at 16 and added to the offset voltage present on the line 18a) are sent to the two inputs, a direct input 20A and an inverting input 20B, of a comparator 20 the output of which presents the signal indicative of pinking. This signal can be used by the microprocessor: on the basis of this signal, the microprocessor operates the procedure for adjusting the advance.

The band-pass filters F1 and F2 have bands of approximately 0.6–1KHz with their tuning frequencies situated around the first two peaks of the accelerometric signal which appears in the presence of pinking, for example, 8 and 13.8 KHz (with reference to the examples quoted in the introduction to the description). They have linked central frequencies f1 and f2 which can be varied by the intervention of the microprocessor 6 so as to be able to compensate for the frequency shift (delta f) caused by variations in the rate of rotation of the engine.

The output signals of the rectifiers R1 and R2 are compared with each other: if the signal in correspondence with the second peak (13.5 KHz) is significant — for example, if it is greater than ¼ that of the first peak (8 KHz) — the two signals are added and integrated during the measurement or listening window (70° after TDC); use is thus made of the better S/N ratio of the second peak (but this is not always present: it depends on the intensity of the pinking).

The filter F3 (band-pass or low-pass), the rectifier R3 and the integrator 11 provide a signal proportional to the noise level; in the absence of pinking, the integrator circuit 5 integrates the sum of the two noise signals: for this reason, the noise level brought to the input of the integrator 11 must be multiplied by the square root of 2.

The filter 16 averages the values attained by the output of the integrator 11 at the end of the measurement window. The filter 16 must therefore be synchronised with this moment and hence needs the relative signal f alpha applied to its input 17.

The output signals of the two chains which process the accelerometer signal are compared with each other to indicate the presence of pinking, after the average noise level has been increased by the addition thereto of the offset voltage 18a determining the threshold at which the output of the comparator 20 switches over.

The pinking detection method carried out by the device 1 according to the invention is therefore based on the monitoring of the signal of the accelerometric sensor in the two bands (for example, around 8 and 13.8 KHz) in which the peaks indicative of the presence of pinking may appear. This component of the signal is then compared with the noise component by a different method according to whether or not the intensity of the signal detected in correspondence with the second peak (13.8 KHz) reaches a given minimum level (e.g. ¼) relative to the intensity of the signal detected in correspondence with the first peak (8 KHz).

In the first case (a perceptible signal at the second peak, which also includes the case of the absence of pinking with no peaks and the detection of just the background noise by the filters F1 and F2) the two useful signal components are added together, integrated during the observation window, and then compared with the noise component increased by a factor of the square root of 2.

In the other case, only the signal at the first peak is integrated and compared with the noise component, without the latter being increased by the factor of the square root of 2.

In both cases, pinking is indicated when the noise signal component exceeds the noise component by a given factor (K), with the possibility of translation of the level of the noise component by the addition thereto of an offset voltage which enables the intervention level of the device to be varied selectively.

Naturally, the principle of the invention remaining the same, the forms of embodiment and details of construction may be varied widely with respect to those described and illustrated, without thereby departing from the scope of the present invention.

We claim:

1. A device for detecting pinking in an internal combustion engine, which is intended to be connected to a sensor associated with the engine, the sensor generating a signal with a noise component and a useful signal component whose spectrum may have peaks indicative of the presence of pinking in a plurality of frequency ranges, including:

first and second monitoring means which are sensitive to the useful signal component in at least a first and a second of the frequency ranges and can generate first and second monitoring signals, first comparator means which can compare the first and second monitoring signals and generate a logic signal which assumes a first value or a second value when the second monitoring signal reaches a given level relative to the first monitoring signal or is below the given level, respectively, adding means which can be supplied with the first and second monitoring signals, multiplier means which can be supplied with the noise component of the signal from the sensor, second comparator means which have a first input and a second input and can generate a signal indicative of the presence of pinking when the signal at the first input exceeds the signal at the second input by a given factor and switching means which are controlled by the logic signal an can assume a first operating position or a second operating position when the logic signal assumes the first value or the second value respectively, the switching means connecting:

the first and second monitoring signals to the adding means, the adding means to the first input of the second comparator means, the noise component to the multiplier means and the output of the multiplier means to the second input of the second comparator means in the first operating position, and only the first monitoring signal to the first input of the second comparator means and the noise component to the second input of the second comparator means, in the second operating position.

2. A device according to claim 1, wherein the given level is selected to be substantially equal to one quarter of the level of the first monitoring signal.

3. A device according to claim 1, wherein the first and second monitoring means each include a band-pass filter and a rectifier connected together in cascade.

4. A device according to claim 3, wherein the rectifiers are double-half-wave rectifiers.

5. A device according to claim 1, wherein first and second monitoring means include respective band-pass filters with tuning frequencies which are variable selectively and are coupled in a substantially fixed ratio.

6. A device according to claim 1, wherein the first and second monitoring means include respective band-pass filters which operates in the region of 8 KHz and 13.8 KHz respectively.

7. A device according to claim 1, wherein the first and second monitoring means include band-pass filters with band widths of the order of 0.6–1 KHz.

8. A device according to claim 1, including third monitoring means which are sensitive to the noise component and include at least one band-pass or low-pass filter for generating a noise component of reduced band width.

9. A device according to claim 8, wherein a rectifier is arranged in cascade with the filter of the third monitoring means.

10. A device according to claim 1, wherein the multiplier means multiply the noise component by a factor substantially equal to the square root of 2.

11. A device according to claim 1, wherein respective integrator means which operate during a time window of given length and phase are associated with the inputs of the second comparator means.

12. A device according to claim 11, wherein the duration of the time window corresponds to approximately 70° of the engine cycle in the region of the top dead centre of combustion.

13. A device according to claim 11, wherein a further filter for generating filtered samples of the noise component is associated with the integrator means associated with the second input of the second comparator means.

14. A device according to claim 13, wherein the further filter operates in synchronism (fα) with the time window.

15. A device according to claim 1, wherein adjustment means are associated with the second comparator means for selectively varying the generation threshold of the signal indicative of the presence of pinking.

16. A device according to claim 15, wherein the adjustment means include an adding node for adding a selectively variable offset voltage to the signal brought to the second input of the second comparator means.

17. A device according to claim 1, associated with an accelerometric sensor which is sensitive to the vibrations of the internal combustion engine.

18. A method for detecting pinking in an internal combustion engine by means of a sensor associated with the engine, the sensor generating a signal having a noise component and a useful signal component whose spectrum may have peaks indicative of the presence of pinking in a plurality of frequency ranges including the steps of:

generating first and second monitoring signals indicative of the intensity of the useful signal component in at least a first and a second of the frequency ranges, comparing the first and second monitoring signals and generating a logic signal which assumes a first value or a second value when the second monitoring signal reaches a given level relative to the first monitoring signal or is below the given level, respectively, and generating a signal indicative of the presence of pinking in dependence on a comparison between a first decision signal and a second decision signal, the first and second decision signals being selected respectively:

as the sum of the first and second monitoring signals and as the noise component multiplied by a given multiplying factor, when the second monitoring signal reaches the given level relative to the first monitoring signal, and as only the first monitoring signal and as the noise component, when the second monitoring signal is below the given level.

19. A method according to claim 18, wherein the given level is selected to be substantially equal to one quarter of the first monitoring signal.

20. A method according to claim 18, wherein the first and second decision signals are integrated during a time window of given length.

21. A method according to claim 18, wherein the said at least one first and one second frequency ranges selected are in the region of 8 KHz and 13.8 KHz, respectively.

22. A method according to claim 18, wherein the multiplying factor is selected to be substantially equal to the square root of 2.

* * * * *